(12) United States Patent
Clement

(10) Patent No.: US 10,011,199 B2
(45) Date of Patent: Jul. 3, 2018

(54) REAR FACING RIDE DOWN SAFETY SEAT

(71) Applicant: DIONO, LLC, Puyallup, WA (US)

(72) Inventor: David Clement, Colorado Springs, CO (US)

(73) Assignee: Diono, LLC, Sumner, WA (US)

( * ) Notice: Subject to any disclaimer, the term of this patent is extended or adjusted under 35 U.S.C. 154(b) by 252 days.

(21) Appl. No.: 14/528,627

(22) Filed: Oct. 30, 2014

(65) Prior Publication Data

US 2016/0121764 A1 May 5, 2016

(51) Int. Cl.
*B60N 2/28* (2006.01)

(52) U.S. Cl.
CPC ......... *B60N 2/2884* (2013.01); *B60N 2/2821* (2013.01); *B60N 2/2845* (2013.01); *B60N 2/2851* (2013.01); *B60N 2/2863* (2013.01); *B60N 2/2875* (2013.01)

(58) Field of Classification Search
None
See application file for complete search history.

(56) References Cited

U.S. PATENT DOCUMENTS

| | | | |
|---|---|---|---|
| 5,286,085 A | 2/1994 | Minami | |
| 5,366,269 A | 11/1994 | Beauvais | |
| 5,551,751 A | 9/1996 | Sedlack et al. | |
| 5,722,719 A * | 3/1998 | Glomstad | B60N 2/2821 297/216.11 |
| 5,971,479 A * | 10/1999 | Jacquemot | B60N 2/2821 297/250.1 |
| 6,454,350 B1 | 9/2002 | Celestina-Krevh et al. | |
| 6,821,753 B2 | 11/2004 | Coffin | |
| 7,070,236 B2 | 7/2006 | Kawashima | |
| 7,073,859 B1 | 7/2006 | Wilson | |
| 7,914,075 B2 | 3/2011 | Danziger | |
| 8,348,337 B2 | 1/2013 | Franck et al. | |
| 8,632,124 B2 | 1/2014 | Clement et al. | |
| 9,825,789 B1 | 11/2017 | Patel et al. | |

(Continued)

FOREIGN PATENT DOCUMENTS

| | | |
|---|---|---|
| CN | 102811884 | 12/2012 |
| EP | 2230125 | 9/2010 |

(Continued)

OTHER PUBLICATIONS

International Search Report and Written Opinion for PCT/US2015/57650, dated Jan. 21, 2016.

(Continued)

*Primary Examiner* — David E Allred
(74) *Attorney, Agent, or Firm* — Stetina Brunda Garred & Brucker

(57) ABSTRACT

A safety seat includes a base unit adapted to be attached to the vehicle. The base unit includes a base body, and a base carriage coupled to the base body and moveable relative thereto from a resting position to a ride down position. Movement of the base carriage from the resting position to the ride down position is caused by a force acting on the base carriage that is above a prescribed threshold. A braking element is coupled to the base body and the base carriage, and is adapted to bias the base carriage toward the resting position. A seat unit is detachably engageable with the base carriage and defines a seat cavity sized and configured to receive the child.

15 Claims, 8 Drawing Sheets

(56) References Cited

U.S. PATENT DOCUMENTS

| | | | |
|---|---|---|---|
| 2002/0060483 A1* | 5/2002 | Yoshida | B60N 2/2821 297/250.1 |
| 2003/0209926 A1 | 11/2003 | Nakagawa et al. | |
| 2004/0095005 A1* | 5/2004 | Dukes | B60N 2/0232 297/256.13 |
| 2007/0057544 A1* | 3/2007 | Nakhla | B60N 2/2884 297/250.1 |
| 2009/0102253 A1* | 4/2009 | Forbes | B60N 2/2884 297/216.11 |
| 2010/0007187 A1 | 1/2010 | Hutchinson et al. | |
| 2011/0062756 A1* | 3/2011 | Campbell | B60N 2/2812 297/250.1 |
| 2011/0233978 A1 | 9/2011 | Clement et al. | |
| 2011/0272983 A1* | 11/2011 | Fritz | B60N 2/2806 297/250.1 |
| 2012/0280540 A1* | 11/2012 | Pedraza | B60N 2/2806 297/148 |
| 2012/0319442 A1 | 12/2012 | Clement | |
| 2014/0239684 A1* | 8/2014 | Mindel | B60N 2/2824 297/216.18 |
| 2014/0354021 A1* | 12/2014 | Sedlack | B60N 2/2821 297/216.11 |

FOREIGN PATENT DOCUMENTS

| | | | |
|---|---|---|---|
| JP | WO 03018352 A1 * | 3/2003 | B60N 2/2806 |
| WO | WO9825789 | 6/1998 | |
| WO | WO2005012032 | 2/2005 | |
| WO | WO2010128468 | 11/2010 | |

OTHER PUBLICATIONS

Canadian Office Action for CA 2,964,124; dated Feb. 1, 2018.
Supplemental European Search Report for EP 15 85 5312; dated Apr. 25, 2018.

\* cited by examiner

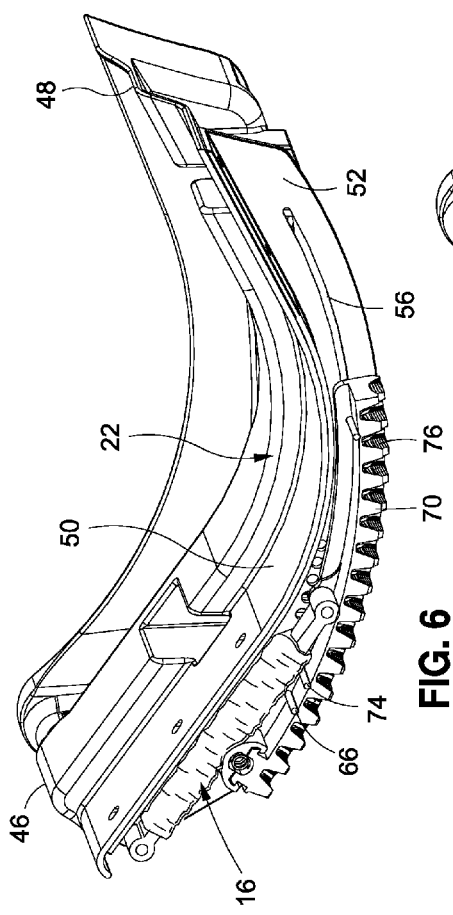
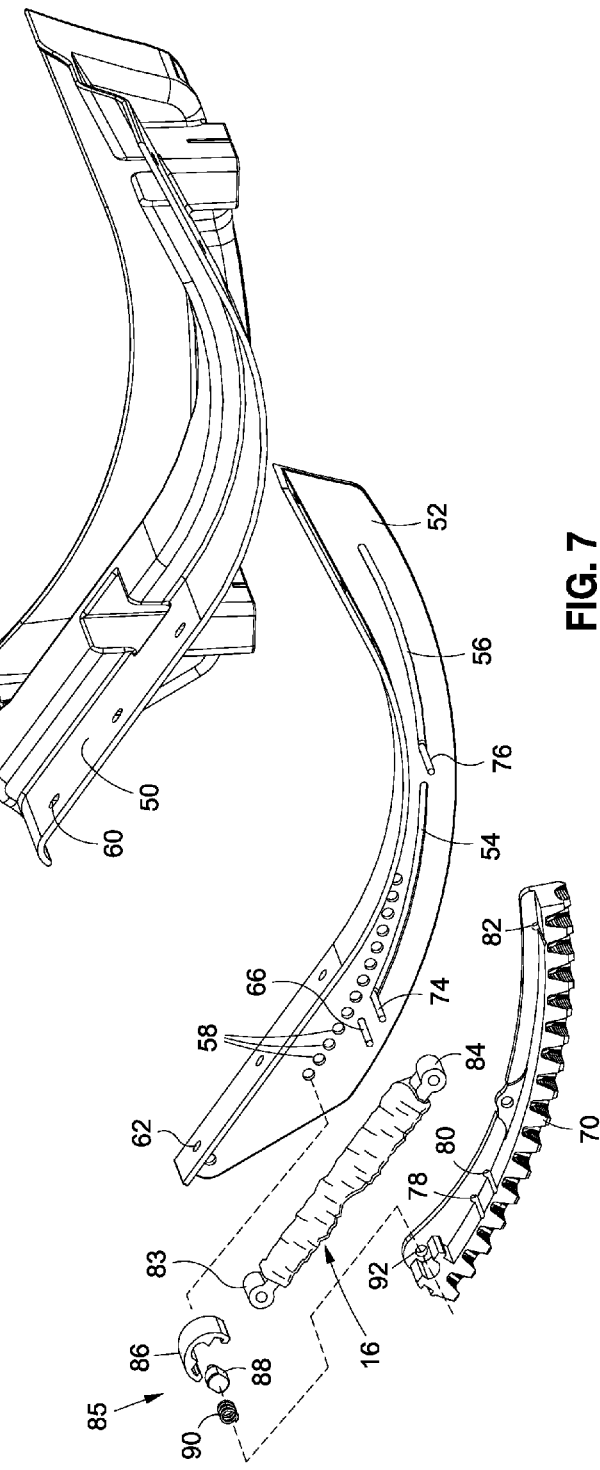

REAR FACING RIDE DOWN SAFETY SEAT

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Field of the Invention

The present invention relates generally to vehicle safety seats for children, and more specifically to a rear facing vehicle safety seat having a seat unit detachably engageable with a corresponding base unit, wherein the seat unit is capable of moving relative to portions of the base unit during an accident to dampen sudden and potentially dangerous forces applied to the seat as a result of such accident.

2. Description of the Related Art

Child safety seats which are specifically adapted for use in a vehicular environment are well known in the art. Many such safety seats are secured to an existing vehicle car seat, with the child being placed within the safety seat to secure the child during travel. These prior art safety seats are typically in the form of a child/infant car seat or a booster seat. A child car seat is typically secured directly to the vehicle, such as by the vehicle's seat belt system or directly to the frame of the vehicle using hooks, and other attachment mechanisms and systems. The car seat is also outfitted with its own, dedicated restraint or harness system to secure the child therein, such harness system generally being referred to as five-point harness system.

Booster seats are typically used for older children. This type of seat meets all government standards as to safety and is appropriate for children from toddler up to a particular size, such booster seats thus being used to accommodate children too large to fit into the above-described car seat, but still too small to properly use the restraining systems of standard automobiles, that is, the seat and/or harness shoulder straps in these systems. There are currently known booster seats which include many of the same structural features as car seats, including a dedicated harness system as well as attachment mechanisms such as an arrangement of straps/tethers operative to facilitate the engagement thereof to corresponding rigid attachment points provided within the vehicle. However, there are also booster seats that are not outfitted with a dedicated harness system or an attachment mechanism operative to facilitate the attachment thereof to corresponding rigid attachment points of the vehicle, such booster seats simply being used in concert with the existing seat belt system of the vehicle to restrain the child therein. For ease of discussion, child car seats and booster seats which are adapted for use with children within prescribed size/weight ranges and outfitted with attachment mechanism specifically adapted to engage corresponding rigid attachment points of the vehicle will collectively be referred to as "child safety seats."

Many countries around the world have standardized how a child safety seat is to be secured to a vehicle seat and how movement of the safety seat is controlled in the event of an impact to improve the overall safety of safety seats in vehicles. A system called Lower Anchors and Tethers for Children (LATCH) is commonly used for this purpose, which includes two lower anchor attachments and a top tether. The term is often used generically to refer only to the pair of fixed lower loop shaped anchors built into the bight or crack between the seat back and seat cushion. The LATCH system was originally called ISOFIX, which is a term still used in Europe. Canada, employs a similar standard called the Universal Anchorage System (UAS). It has also been called the Universal Child Safety Seat System or UCSSS. All of foregoing systems refer to the same universal anchorages that started to appear on car models starting in about the year 2000. These are now required by law in the United States for almost all model year 2003 and later vehicles.

When a LATCH system is used, existing seatbelts are no longer necessary to install the child safety seat since it is mounted directly to the vehicle via the metal loops using webbing or a "rigid" connector. The safety seat often includes releasable clips to engage with the metal loops of the LATCH system. This makes it easier to safely install safety seats, and to make it more universal among car seats and vehicles. Compatible corresponding LATCH coupling systems are now commonly found on child safety seat bases, including rear-facing, front-facing and combination car/booster seats. Further details of the LATCH system need not be discussed in further detail as it is so well known in the art. It should also be understood that the LATCH system, although a preferred method, is just one way to secure a child safety seat to a supporting vehicle seat.

In view of the requirement to fixedly secure child safety seats to a supporting vehicle seat, there are challenges in the industry for control over the movement of the seat itself in the event of an impact to the vehicle, such as during an accident. More specifically, there is a concern as to movement of the safety seat in such conditions because excessive forces exerted can cause injury to a child therein.

For example, when a child safety seat is fixedly connected to a vehicle, an accident may cause impact forces that may result in very sudden and abrupt movements to the child. It has been shown that these sudden and abrupt movements to a child in a child safety seat is more likely to injure a child than movements that are less abrupt. For example, sudden stopping of a vehicle and the sudden stopping of forces to a child safety seat is more likely to injure a child than where such forces are stopped in a slower or decelerated fashion.

In view of this, some child safety seats are designed with features that in some way decelerate the child's movement relative to the movement of the vehicle. This helps reduce resulting impact forces to the child and helps prevent injuries to a child. This deceleration is often called "ride down" where some type of load limiting is provided to manage the deceleration rate of the child car seat.

Although having "ride down" capabilities in a child safety seat may provide significant safety benefits, there have been difficulties in incorporating such capabilities into the structure of the safety seat. Indeed, the difficulties include creating a safety seat which remains substantially stationary to a vehicle during normal use, while at the same time, has the ability to enable a limited amount of movement for purposes of dampening forces in the event of an accident. The difficulties are further complicated by a desire to incorporate recline adjustability into the safety seat, which would add another species of movement, albeit user actuated, into the seat design. Many of these design challenges have been addressed in those exemplary implementations of ride down capability within safety seats as found in Applicant's U.S. Pat. No. 8,632,124 entitled Reclining Ride Down Child Seat and U.S. Patent Publication No. 2012/0319442 entitled Crash Indication System for a Reclining Ride Down Child Seat, the disclosures of which are incorporated herein by reference.

However, there is still a need for a child safety seat, and notably a rear facing safety seat for an infant, that includes a ride down capability while also being able to provide recline angle adjustment for further comfort of the child without sacrificing safety of the child. Various aspects of the present invention address this particular need, as will be discussed in more detail below.

BRIEF SUMMARY OF THE INVENTION

In accordance with one embodiment of the present invention, there is provided a rear facing safety seat for use by a child in a vehicle, wherein the safety seat includes a base unit and a seat unit configured to be detachably engageable with the base unit. The safety seat is specifically configured and adapted to enable "ride down," e.g., limited movement, of the safety seat relative to portions of the base unit when forces generated by an accident exceed a prescribed threshold. The safety seat also includes recline adjustability of the seat unit relative to the base unit. In this respect, the user may selectively adjust the recline angle of the seat unit relative to the base unit, depending on the desired angle of recline for the child seated therein. Furthermore, when the seat unit is attached to the base unit, and the forces acting on the safety seat are below the prescribed threshold, the seat unit will remain substantially stationary relative to the base unit. However, in the event of an accident which results in forces acting on the safety seat which are above the prescribed threshold, a ride down system incorporated into the safety seat is actuated, which allows the seat unit to move relative to portions of the base unit to more safely dissipate the forces acting on the child. A braking element is coupled to the seat unit and the base unit to apply a braking force on the seat unit as it moves relative to the base unit during ride down.

According to one embodiment, the safety seat includes a base unit adapted to be attached to the vehicle. The base unit includes a base body, and a base carriage coupled to the base body and moveable relative thereto from a resting position toward a ride down position. Movement of the base carriage from the resting position to the ride down position is caused by the application of a force to the base carriage that is above a prescribed threshold. A braking element is coupled to the base body and the base carriage, and is adapted to normally bias the base carriage toward the resting position. A seat unit is detachably engageable with the base carriage and defines a seat cavity sized and configured to receive and accommodate the child.

The safety seat may further include a primary locking mechanism connecting the base carriage to the base body. The primary locking mechanism is configured to mitigate movement of the base carriage relative to the base body when forces acting on the base carriage are below the prescribed threshold. The primary locking mechanism may include a sacrificial pin extending between the base body and the base carriage and adapted to break when the force acting on the base carriage is above the prescribed threshold to enable movement of the base carriage relative to the base body.

The safety seat may further comprise a secondary locking mechanism which prevents movement of the base carriage from the ride down position toward the resting position. The secondary locking mechanism may include a spring-biased detention member which works in concert with and is selectively engageable to any one of a plurality of holes formed in the base carriage.

The base unit may further include an adjustment mechanism coupled to the base body and the base carriage to enable selective positioning of the base carriage relative to the base body. The adjustment mechanism may include a worm gear element rotatably connected to the base body and a complementary rack element attached to the base carriage.

The safety seat may additionally include a guide pin which extends through a corresponding slot formed in the base carriage.

The braking element may comprise partially oriented yarn (POY). The braking element may be sacrificial in response to movement of the base carriage from the resting position toward the ride down position.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 6 is an assembled, top perspective view of a base carriage, braking element, and rack member which are all integrated into the base unit;

FIG. 7 is an exploded top perspective view of the base carriage, braking element, and rack member shown in FIG. 6;

Common reference numerals are used throughout the drawings and the detailed description to indicate the same elements.

DETAILED DESCRIPTION OF THE INVENTION

Figure 1:
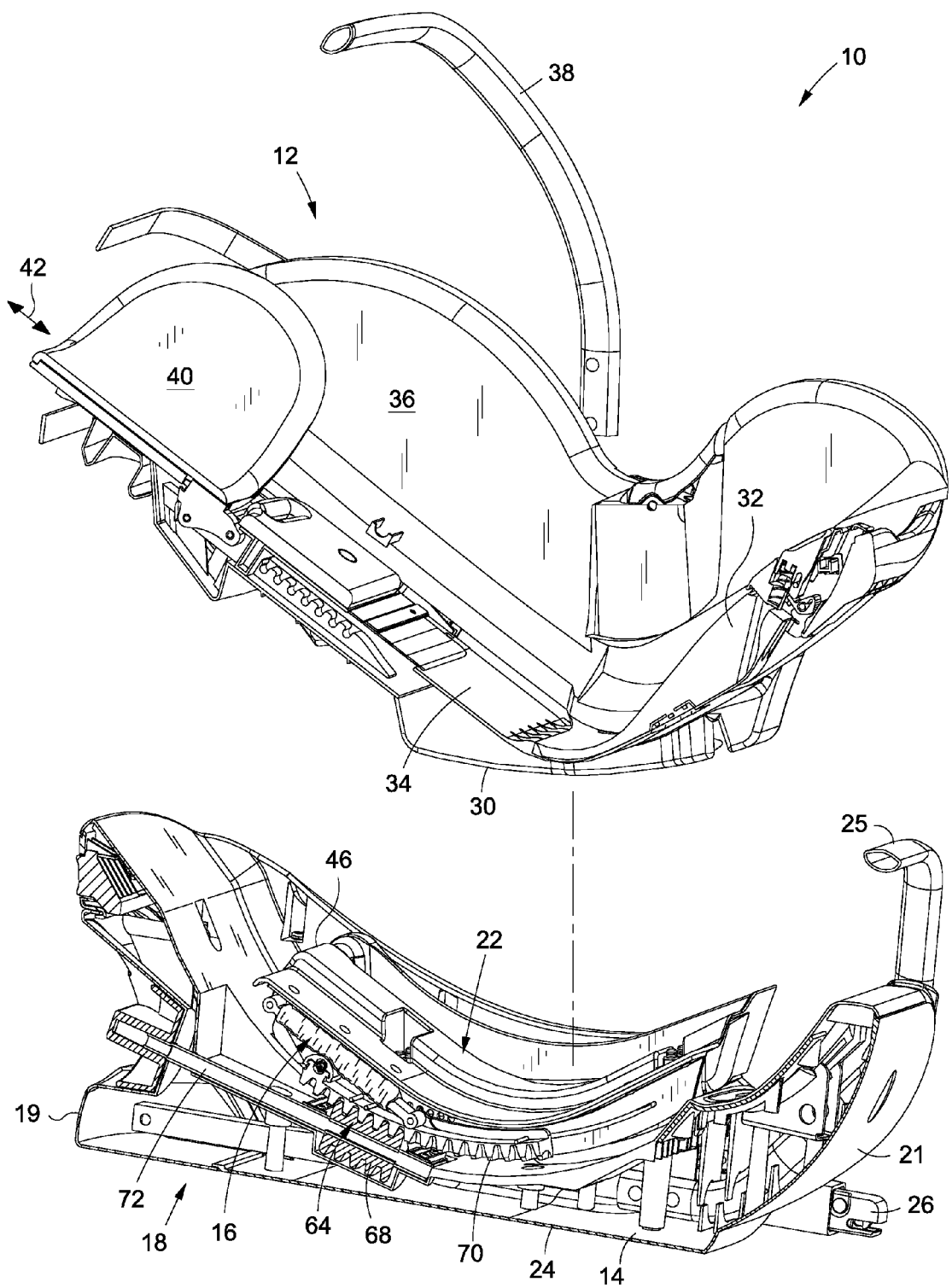
FIG. 1 is a top perspective, sectional view of a child safety seat depicting the seat unit of the safety seat as detached from the base unit thereof.

The detailed description set forth below in connection with the appended drawings is intended as a description of certain embodiments of a rear facing ride down safety seat and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Referring now to the drawings, there is depicted a child safety seat 10 for use in a vehicle for safely securing a child within the vehicle. Various aspects of the present invention are directed toward reducing the forces experienced by the child seated within the seat 10 during an accident or similar event wherein a sudden force is applied to the seat 10 and the child accommodated thereby. As will be described in more detail below, the safety seat 10 includes a cradle or seat unit 12 which is moveable relative to a base unit 18 (and more particularly a base body 14 of the base unit 18) between a resting position and a "ride down" position. Such movement typically occurs as a result of the force which may be applied to the seat 10 during, for example, a car accident. Movement of the seat unit 12 relative to the base body 14 is limited and controlled by a braking element 16, which dampens such relative movement to protect the child within the seat 10 from more sudden and dangerous decelerations. The safety seat 10 is further configured and adapted to allow for selective and incremental recline adjustment of the seat unit 12 relative to the base body 14 of the base unit 18. In this respect, the safety seat 10 is capable of enabling a first range of movement of the seat unit 12 relative to the base body 14 for dampening forces associated with an accident, and a second range of movement of the seat unit 12 relative to the base body 14 for enabling selective recline adjustment of the seat unit 12 relative to the base body 14.

FIG. 1 is a top perspective, sectional view of one embodiment of the child safety seat 10 generally comprised of the seat unit 12 and the corresponding base unit 18. Like many other conventional child safety seats, the seat unit 12 is specifically configured and adapted to be detachably engageable with the base unit 18. FIG. 1 shows the seat unit 12 as detached from the base unit 18. The base unit 18 includes a first end 19 and an opposing second end 21. The base unit 18 may be, and is preferably, secured to the vehicle in a "rear facing" orientation, wherein the first end 19 is directed toward the front of the vehicle and the second end 21 is directed toward the rear of the vehicle. It is also contemplated that the base unit 18 may be secured to the vehicle in a "forward facing" configuration, wherein the first end 19 is directed toward the rear of the vehicle and the second end 21 is directed toward the front of the vehicle. Although the safety seat 10 preferably is adaptable to enable securement in both the forward facing and rear facing configurations, it is generally recommended to place the base unit 18 in the rear facing configuration when the child is very young, e.g., typically less than one year old, as it tends to offer certain safety advantages relative to the forward facing orientation.

The base unit 18 includes the aforementioned base body 14 and a base carriage 22 which is adapted to be detachably engaged with the seat unit 12. The base body 14 includes a generally flat lower surface 24 which is adapted to rest on an existing seat in a vehicle (see FIG. 3). The base body 14 is preferably formed from a strong durable material, such as a molded polymer, although other materials known in the art may also be used in the fabrication thereof. According to one embodiment, the base unit 18 is specifically configured and adapted to be secured to the vehicle. For instance, the base unit 18 may include a pair of LATCH (Lower Anchors and Tethers for Children) clips 26 connected to the base body 14 and configured to be selectively and detachably engageable with existing anchors located on the vehicle. Although LATCH clips are preferred, it is also contemplated that the child safety seat 10 may be secured to the vehicle using a seat belt or other restraining devices known in the art. An anti-rebound bar 25 may be attached to the base body 14 in close proximity to the second end 21 thereof. The bar 25 is adapted to rest against the backrest portion of the vehicle seat (see FIG. 3) when the base unit 12 is in the rear facing configuration to stabilize the seat 10 and minimize rotation of the seat 10 relative to the vehicle seat in the event of a collision.

The seat unit 12 includes a seat body 28 having a lower engagement portion 30, a seat portion 32, a backrest portion 34, and opposed sidewall portions 36 extending upwardly from the seat and backrest portions 32, 34. The lower engagement portion 30 of the seat unit 12 is adapted to be detachably engaged to the base unit 18, as will be described in more detail below. The seat portion 32 is adapted to support the child's bottom and legs, and transitions into the backrest portion 34 which has a contour suited to support the child's back. The sidewall portions 36 extend along respective ones of the opposed lateral sides of the seat body 28 to provide a protective wall or barrier for the child. The seat unit 12 may include one or more layers of padding and a cover (not shown) placed over the seat body 28 to enhance the overall comfort of the seat unit 12.

The seat unit 12 may include a handle 38 connected to the seat body 28 to facilitate lifting and transport of the seat unit 12. The handle 38 may be pivotally connected to the seat body 28 and may pivot between a deployed, upright configuration (as shown in FIG. 1) and a stowed, lowered position, wherein the handle 38 is moved or pivoted toward the backrest portion 34. The handle 38 may also be pivoted to an additional floor support position wherein when the seat unit 12 is detached from the base unit 18 and placed on a floor or other generally horizontal support surface, the handle 38 extends into contact with the support surface in a manner preventing the seat unit 12 from rocking backwards.

The seat unit 12 may additionally include a headrest 40 movably coupled to the seat body 28 and adapted to provide a more comfortable surface for resting the child's head. The headrest 40 may include a padded or cushioned member made of foam or other materials known in the art. According to one embodiment, the headrest 40 is adjustable along axis 42 relative to the seat body 28 to allow the position of the headrest 40 to be adjusted based on the size of the child. Along these lines, the backrest portion 34 may include a series of adjustment elements which are selectively engageable with the headrest 40 to enable selective adjustment of the headrest 40 relative to the backrest portion 34.

Although not shown, the seat unit 12 includes a harness system which may be selectively secured around the child seated therein. The harness system may be a five-point harness system commonly employed in conventional car seats or other restraint systems known in the art.

Figure 2:
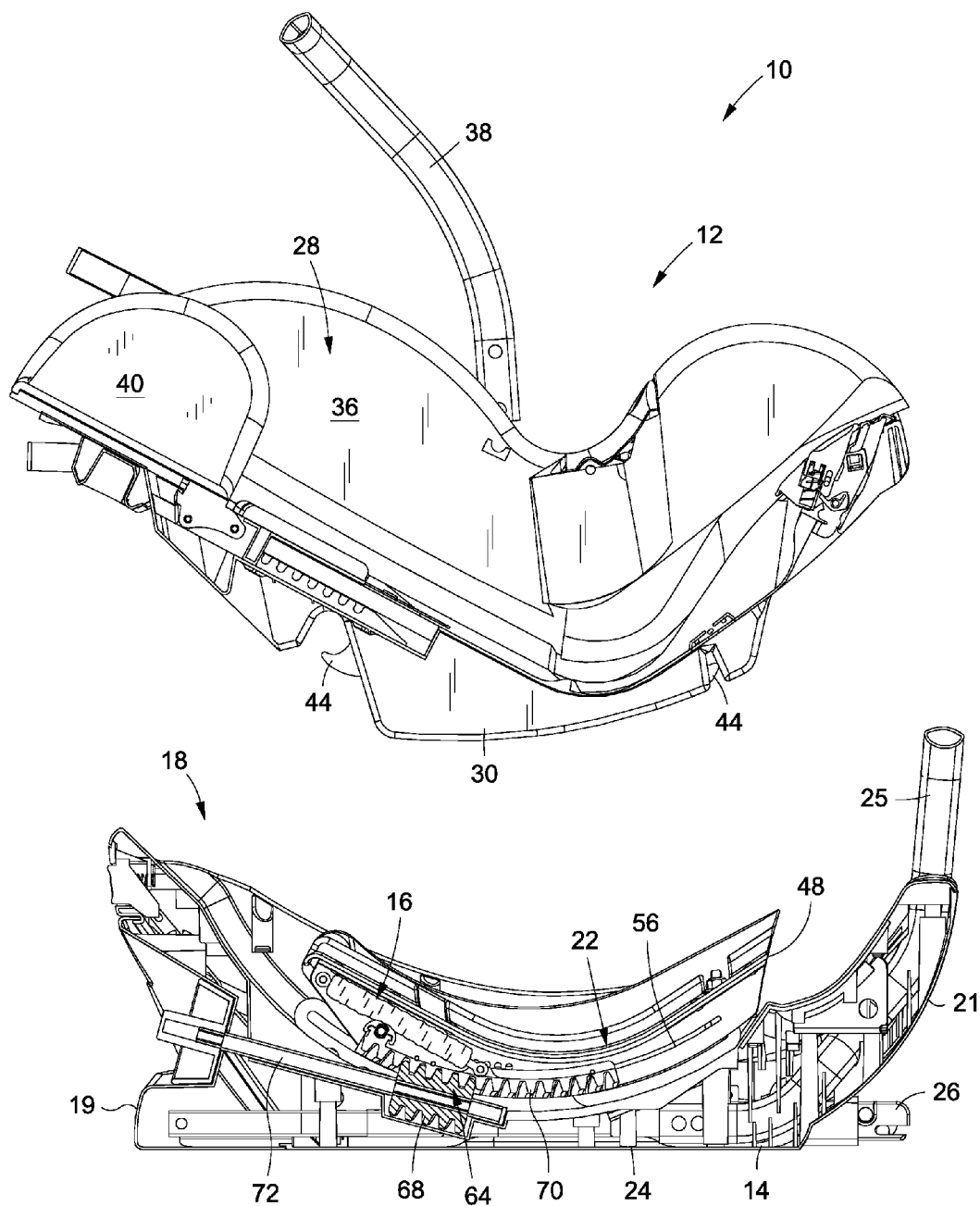
FIG. 2 is a side sectional view of the safety seat shown in FIG. 1, also depicting the seat unit of the safety seat as detached from the base unit thereof.
Figure 3:
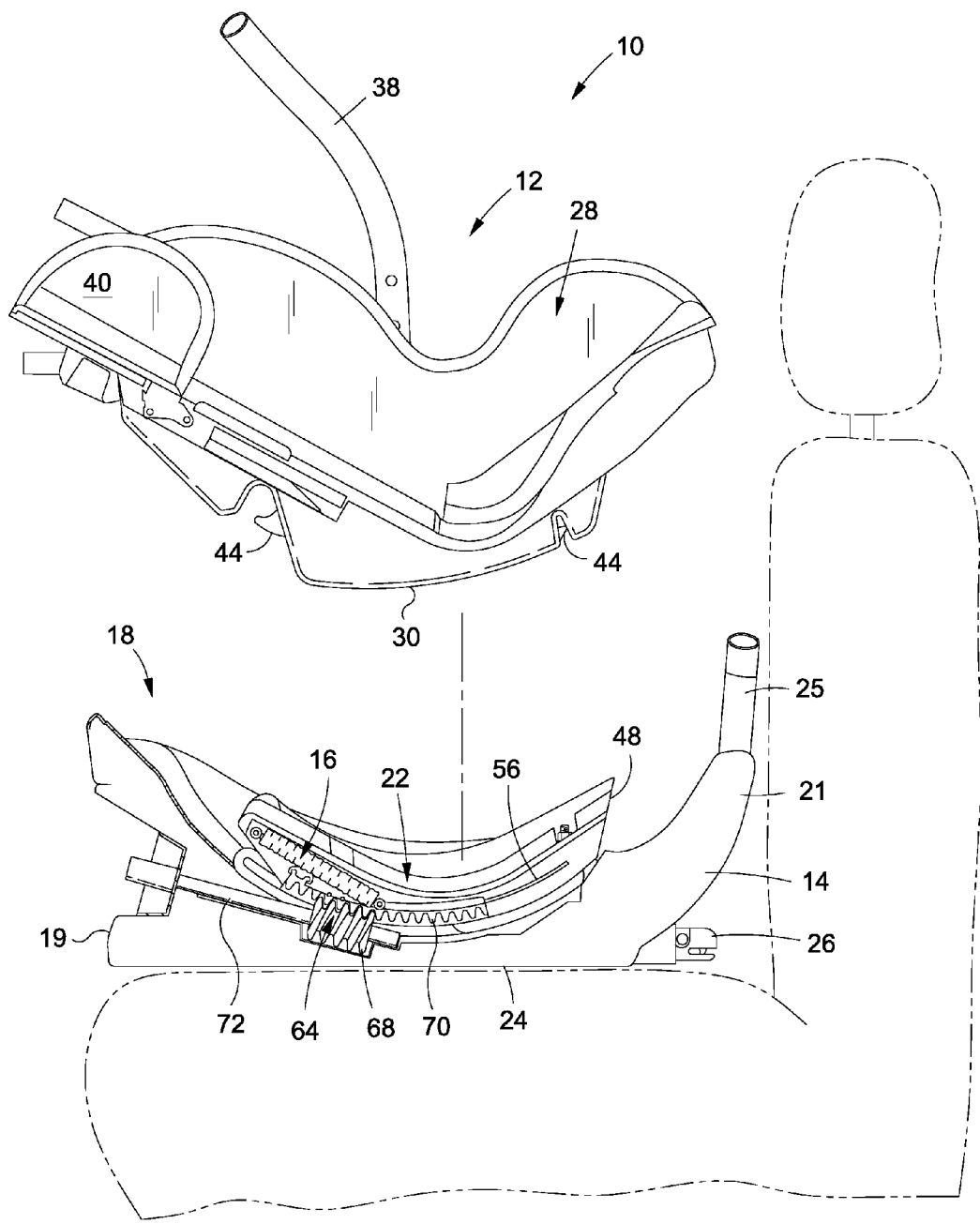
FIG. 3 is a side sectional view of the safety seat similar to FIG. 2, but depicting the base unit resting on a seat in a vehicle (shown in phantom), and the seat unit as being detached from the base unit.

According to one embodiment, the seat unit 12 is detachably engageable to the base unit 18 via the base carriage 22. More specifically, the lower engagement portion 30 of the seat unit 12 engages with the base carriage 22. FIGS. 1-3 show the seat unit 12 as detached from the base unit 18, while FIGS. 4-5 and 8-9 show the seat unit 12 as releasably attached to the base unit 18. It is desirable to have the ability to remove the seat unit 12 from the base unit 18 to carry the child in the seat unit 12, especially when the child is an infant. Being able to maintain the child in the seat unit 12 makes transfer of the child in and out of the vehicle very easy. In order to effectuate attachment of the seat unit 12 to the base unit 18, the seat unit 12 and base unit 18 include cooperatively engageable coupling elements which interface with each other as the seat unit 12 is lowered and nested into the complementary base unit 18. In an exemplary embodiment, the seat unit 12 includes a pair of spring-loaded hooks or latching mechanisms 44 (see FIG. 2) which each engage with a corresponding engagement structure, such as a rod, located on the base carriage 22. In order to disengage the seat unit 12 from the base unit 18, a release mechanism (e.g., button, bar, handle, etc.) may be actuated, which causes the latching mechanisms 44 to become disengaged from the corresponding engagement structures on the base carriage 22, thereby enabling a user to freely lift the seat unit 12 off of the base unit 18. In particular, actuation of the release mechanism may cause the latching mechanisms 44 on the seat unit 12 to retract into the seat unit 12, which allows the user to pull up on the seat unit 12 to remove the seat unit 12 from the base unit 18.

The base carriage 22 serves as the functional interface between the seat unit 12 and the base body 14 of the base unit 18. In particular, within the base unit 18, the base carriage 22 is coupled to the base body 14 and includes a first end 46 which extends toward the first end 19 of the base unit 18, and a second end 48 which extends toward the second end 21 of the base unit 18. Referring now to FIGS. 6 and 7, the base carriage 22 comprises an arcuate upper support member 50 and a lower flange member 52 which is coupled to the support member 50. The support member 50, which faces or is directed toward the seat unit 12 when the seat unit 12 is engaged with the base carriage 22, has a generally concave contour or profile which is generally complementary to the generally convex contour or profile of the lower engagement portion 30 of the seat body 28. In this respect, configuration of the support member 50 is specifically adapted to facilitate its cooperative engagement with the seat body 28 of the seat unit 12. The flange member 52 includes a pair of elongate, arcuate slots 54, 56 formed therein which extend in end-to-end fashion. In addition to the slots 54, 56, the flange member 52 includes a series of apertures 58 formed therein, the use of which will be described in more detail below. The flange member 52 may be attached to the support member 50 via mechanical fasteners, such as screws, rivets, etc., which may be advanced through aligned apertures 60, 62 formed in the support member 50 and flange member 52, respectively. Adhesives or other fastening mechanisms known in the art may also be used for securing the flange member 52 to the support member 50.

The base carriage 22 is coupled to the base body 14 in a manner which allows for movement of the base carriage 22 relative to the base body 14. As will be described in more detail below, movement of the base carriage 22 relative to the base body 14 may comprise one of two different types of movement: the first type of movement is the selective incremental adjustment of the base carriage 22 relative to the base body 14 for adjusting the degree of recline of the seat unit 12 relative to the base unit 18; the second type of movement is referred to herein as "ride down" movement, wherein the base carriage 22 moves in the event of an accident to reduce the deceleration forces imparted on the child seated within the seat unit 12 of the safety seat 10.

Figure 4:
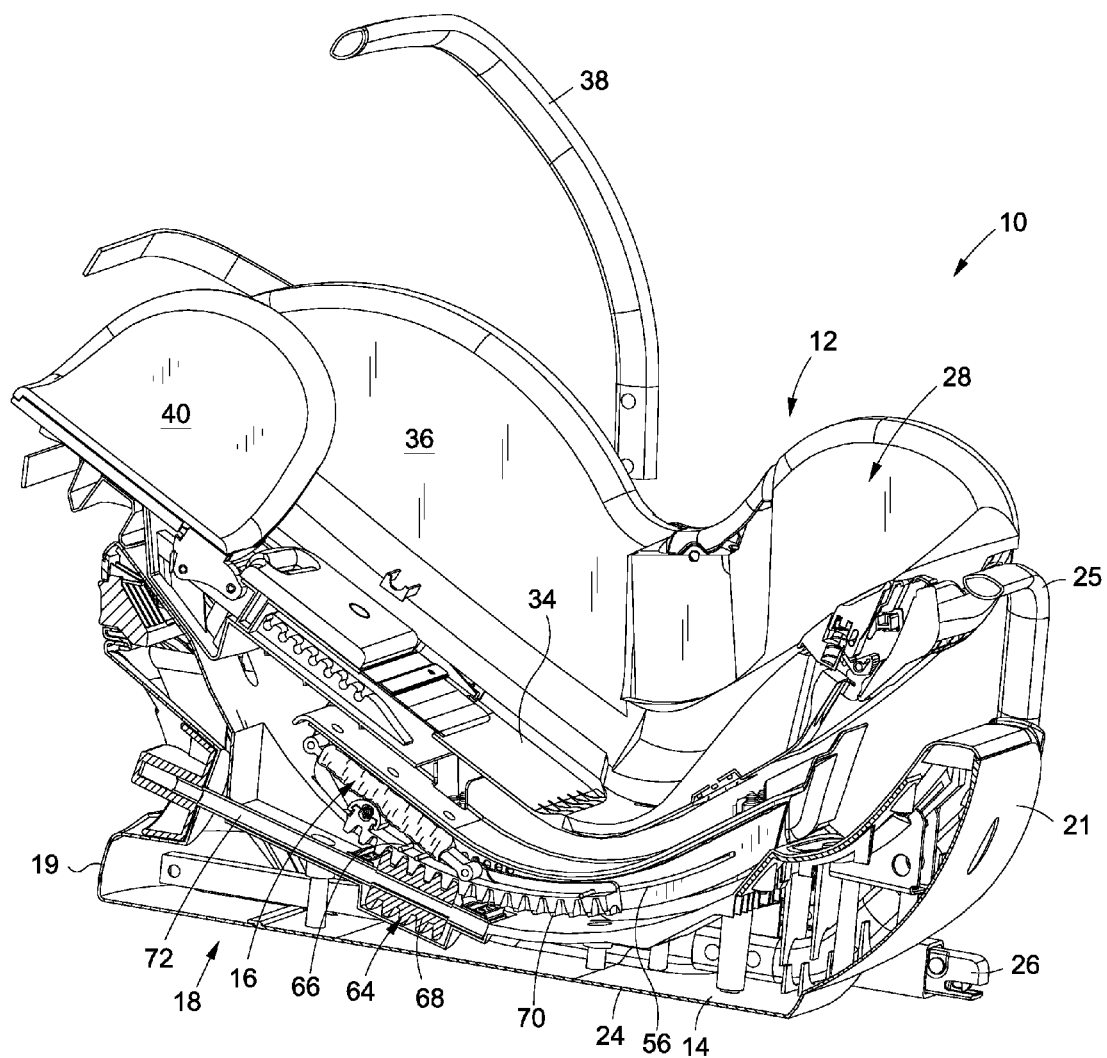
FIG. 4 is a top perspective, sectional view of the safety seat depicting the seat unit of the safety seat as being releasably coupled to the base unit thereof.
Figure 5:
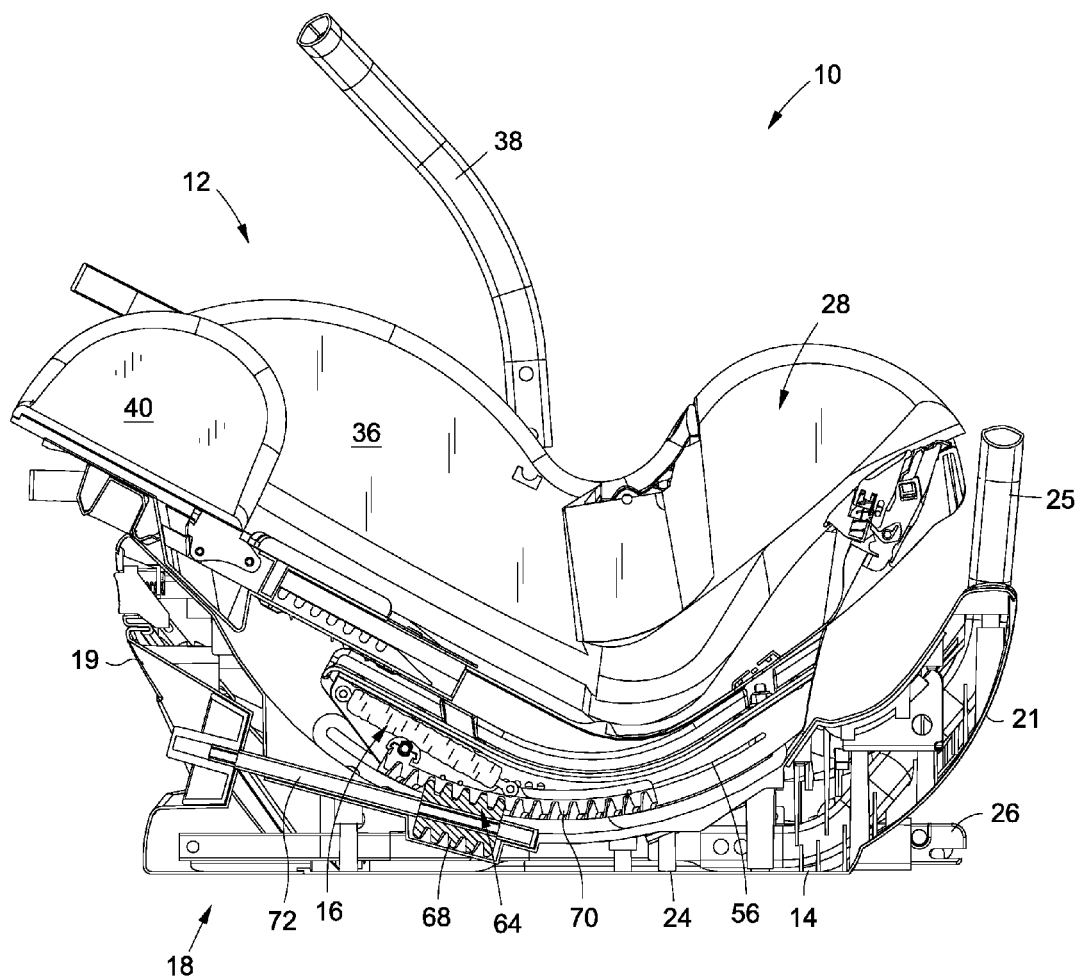
FIG. 5 is a side sectional side view of the safety seat shown in FIG. 4, also depicting the seat unit of the safety seat as being releasably coupled to the base unit thereof.
Figure 10:
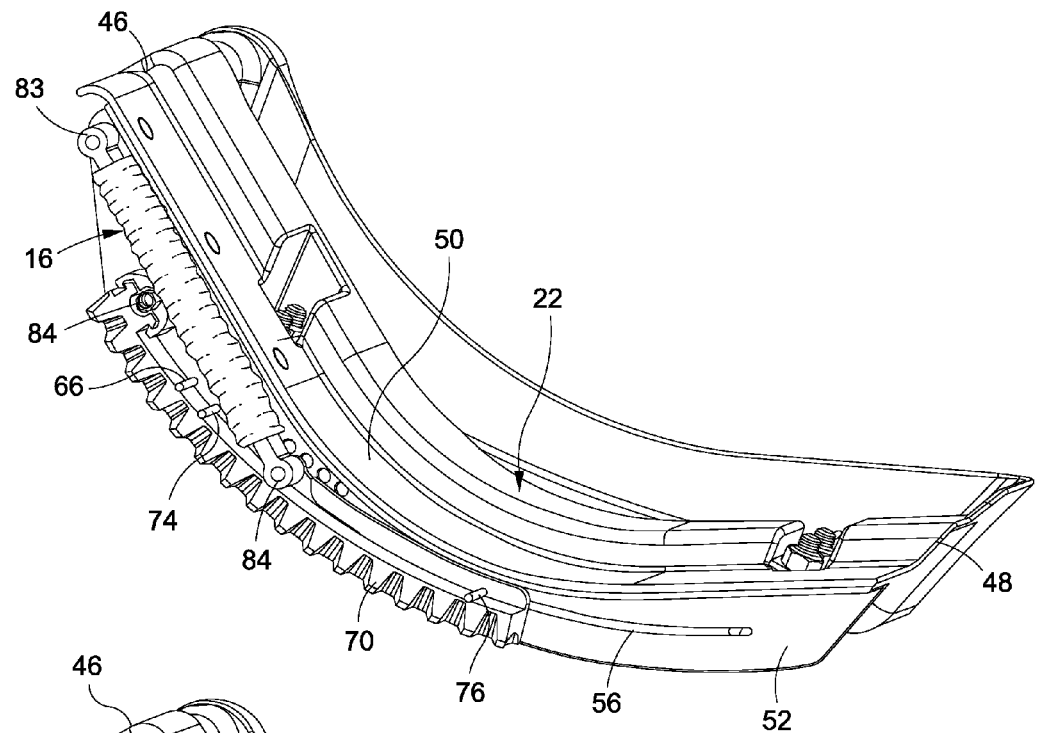
FIG. 10 is a top perspective view depicting the base carriage in a resting position relative to the braking element and the rack member.

The attachment of the base carriage 22 to the base body 14 is effectuated in part through a gear mechanism 64 and a sacrificial shear pin 66, i.e., a "primary locking mechanism" (see FIGS. 4, 6, and 10). The gear mechanism 64 comprises a worm gear 68 which is rotatably connected to the base body 14, and a complementary rack member 70 which is attached to the base carriage 22, and in particular to the flange member 52 thereof. The worm gear 68 is received within a complementary recess or cavity formed in the base body 14, and is capable of rotating within such recess. Rotation of the worm gear 68 in either a clockwise or counter-clockwise direction is effectuated by a manually operable drive shaft 72 having a handle or grip at that end thereof opposite the end having the worm gear 68 disposed thereon. The worm gear 68 is engaged with the rack member 70 such that rotation of the worm gear 68 facilitates the movement of the rack member 70, and hence the base carriage 22 relative thereto along an arcuate path. In greater detail, the arcuate contour of the rack member 70 causes it to move along an arcuate path either toward the first end 19 or the second end 21 of the base unit 18, depending on the rotational direction of the worm gear 68 as facilitated by the rotation of the shaft 72 and associated handle. By virtue of the attachment of the rack member 70 to the base carriage 22, the movement of the rack member 70 relative to the worm gear 68 facilitates the concurrent movement of the base carriage 22 relative to the base body 14 of the base unit 18 in the aforementioned arcuate path, either toward the first end 19 or the second end 21. Since the base carriage 22 serves as the functional interface between the seat unit 12 and the base body 14 of the base unit 18 as indicated above, when the seat unit 12 is removeably attached to the base unit 18, the selective rotation of the shaft 72 via the associated handle in either a clockwise or counterclockwise direction can be used to selectively adjust the recline angle of the seat unit 12 relative to the base unit 18, and in particular the base body 14 thereof. It is contemplated the range of such angular adjustment capability will be such that the backrest portion 34 of the seat unit 12 will be maintained at least 20° from an imaginary horizontal axis and at least 70° from an imaginary vertical axis when the seat 10 is operatively positioned within a vehicle.

According to one embodiment, the rack member 70 is attached to the base carriage 22 via a sacrificial shear pin 66, as well as two guide pins 74, 76. The two guide pins 74, 76 extend through, and are capable of traveling within, respective ones of the pair of elongate, arcuate slots 54, 56 which, as indicated above, are disposed in an end-to-end arrangement within the flange member 52 of the base carriage 22. The shear pin 66, on the other hand, is rigidly attached to and protrudes from the flange member 52, and is located under the row of retention apertures 58 therein. The rack member 70 includes three small openings or apertures 78, 80, 82, two of which are in close proximity to each other. The opening 78 accommodates the shear pin 66, while the openings 80, 82 accommodate respective ones of the two guide pins 74, 76. The apertures 78, 80, 82 may be in communication with corresponding grooves or channels which are best seen in FIG. 7 and extend from a corresponding aperture 78, 80, 82 such that when the pins 66, 74, 76 are advanced through the respective apertures 78, 80, 82, the pins 66, 74, 76 are also accommodated by respective ones of such grooves. The shear pin 66 may extend through a dedicated aperture formed within the flange 52, or alternatively may be integrally formed with the flange 52.

When the vehicle within which the safety seat 10 is located is involved in an accident and the forces from the accident are above a prescribed threshold, such forces may cause the pin 66 to shear, thereby allowing the flange member 52 (and hence the base carriage 22 and seat unit 12) to move relative to the rack member 70 in an arcuate path via the traversal of the pins 74, 76 within their respective slots 54, 56. In this respect, when the shear pin 66 remains intact, the flange member 52 is coupled to the rack member 70 in a manner which allows the flange member 52 and the rack member 70 to move as a single unit when, for example, the worm gear 68 is rotated to facilitate the recline adjustment of the seat unit 12 relative to the base unit 18. Conversely, the shearing of the shear pin 66 allows the flange member 52 to move relative to the rack member 70 by a defined amount or distance equal to the lengths of the slots 54, 56.

In addition to being cooperatively engaged to the shear pin 66, the flange member 52 is also connected to the rack member 70 by way of the braking element 16. In greater detail, the braking element 16 includes a first end 83 which is attached to the flange member 52 and an opposed second end 84 which is attached to the rack member 70. The braking element 16 is adapted to apply a braking force to the flange member 52 when the flange member 52 moves relative to the rack member 70 during ride down. According to one embodiment, the braking element 16 is formed of partially oriented yarn (POY) having desired elongation properties. In particular, the POY preferably used as the braking element 16 comprises a weave of nylon thread and is configured such that it applies a substantially constant dampening effect or braking force (i.e., constant elongation) when activated. The POY used as the braking element 16 is activated when it transitions from a collapsed position toward an expanded position. Such transition occurs when the shear pin 66 is sheared, allowing the flange member 52 of the base carriage 22 to move relative to the rack member 70, which in turn causes the first end 83 of the braking element 16 (POY) to separate from the second end 84. According to one embodiment, the POY, if used as the braking element 16, is sacrificial and intended for a single use. In particular, the elongation of the POY as the braking element 16 results in sacrificial stretching of the threads. Therefore, once the POY if used as the braking element 16 has been elongated, e.g., transitioned from the collapsed position toward the expanded position, it cannot be reused as the braking element 16. In sum, as the shear pin 66 is sacrificial, it is intended to be sheared when the seat 10 is subjected to an impact force at or beyond a prescribed threshold, such shearing being needed to allow for the movement of the flange member 52 relative to the rack member 70, which in turn results in the stretch and resultant dampening effects of the POY preferably serving as the braking element 16. In the absence of such impact force, pin 66 maintains the flange member 52 and the rack member 70 in fixed relation to each other as is necessary for the aforementioned angular adjustment functionality.

Although the foregoing describes the preferred embodiment as including POY as the braking element 16, other braking elements known in the art may also be used. For instance, springs or pneumatic pistons may also be used to apply a braking force between the base carriage 22 and the base body 14.

As best seen in FIGS. 6 and 7, the safety seat 10 may additionally include a safety locking mechanism 85, i.e., a secondary locking mechanism, including a housing 86, a detention member 88, and a spring 90 configured to lock the seat unit 12 in place when it comes to a stop after ride down. The detention member 88 and spring 90 are captured between the housing 86 and the rack member 70, such that the spring 90 biases the detention member 88 through opening 92 formed in the rack member 70 and toward the flange member 52. The opening 92 is positioned on the rack member 70 such that as the flange member 52 moves relative to the rack member 70, the apertures 58 are sequentially aligned with the opening 92, which allows the detention member 88 to be advanced through any one of the apertures 58 that is aligned with the detention member 88.

It is understood that as the seat unit 12 moves from the resting position toward the ride down position, the detention member 88 is going to engage then release its engagement to the apertures 58 in sequence. In particular, when viewed from the perspective shown in FIG. 7, the series of apertures 58 is going to move relative to the detention member 88 from right to left. The detention member 88 includes an angled tip which allows it to move through the series of apertures 58 as the seat unit 12 transitions from the resting position to the ride down position. However, when the seat unit 12 finally reaches the ride down position, the detention member 88 is advanced through the one of the series of apertures 58 which is aligned therewith due to the biasing force imparted on the detention member 88 via the spring 90. The engagement of the detention member 88 to one of the apertures 58 prevents the seat unit 12 from returning back to the resting position. Thus, the seat unit 12 is stabilized once the forces from the accident have been dissipated to maintain the child in a safe and secure environment.

With the basic structural features of the safety seat 10 described above, the following describes an exemplary use of the safety seat 10. The safety seat 10 is installed in the vehicle, preferably in a rear facing configuration, by securing the base unit 18 to the vehicle. LATCH clips 26 may be attached to corresponding mounts built-in to the vehicle, or alternatively, the base unit 18 may be secured to the vehicle seat through the use of a seat belt. The seat unit 12 is then attached to the base unit 18 via complementary latching mechanisms formed on the seat and base units 12, 18 which engage with each other upon placement of the seat unit 12 on the base unit 18. The child may be secured within the seat unit 12 prior to placement of the seat unit 12 onto the base unit 18, or alternatively, after the seat unit 12 has been placed on the base unit 18. In either case, the child should be fastened into the seat unit 12 using a built-in seat belt or harness system.

Figure 8:
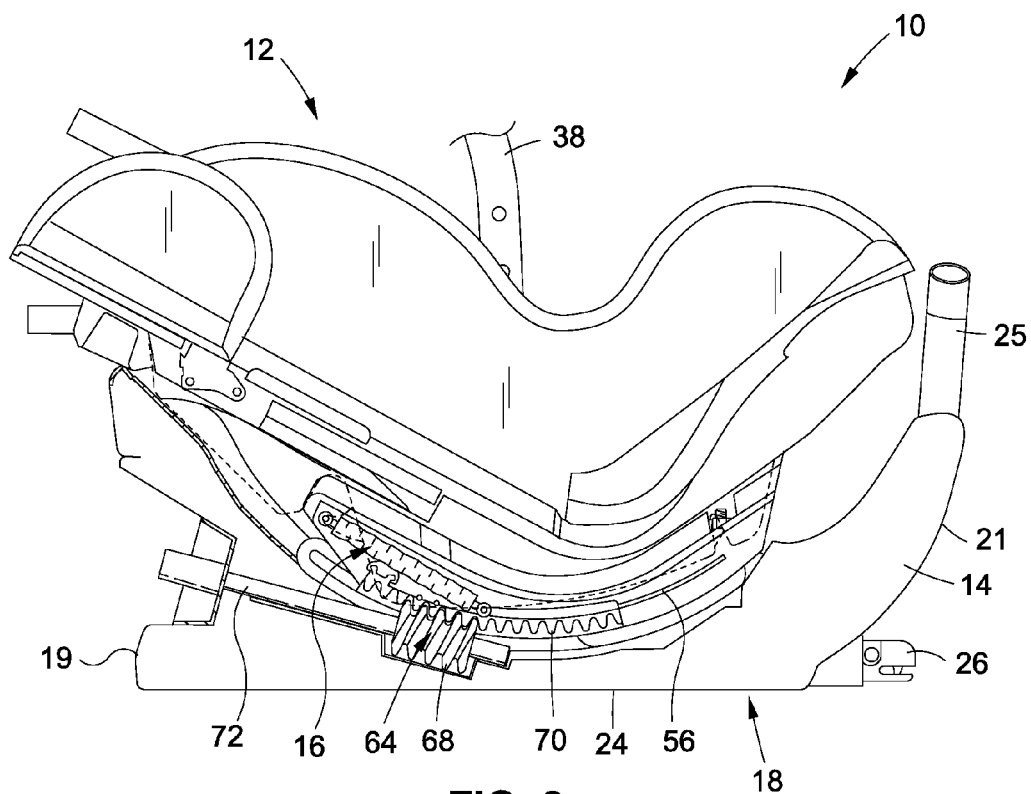
FIG. 8 is a side view of the safety seat depicting the seat unit as coupled to the base unit and in a first exemplary position relative thereto.
Figure 9:
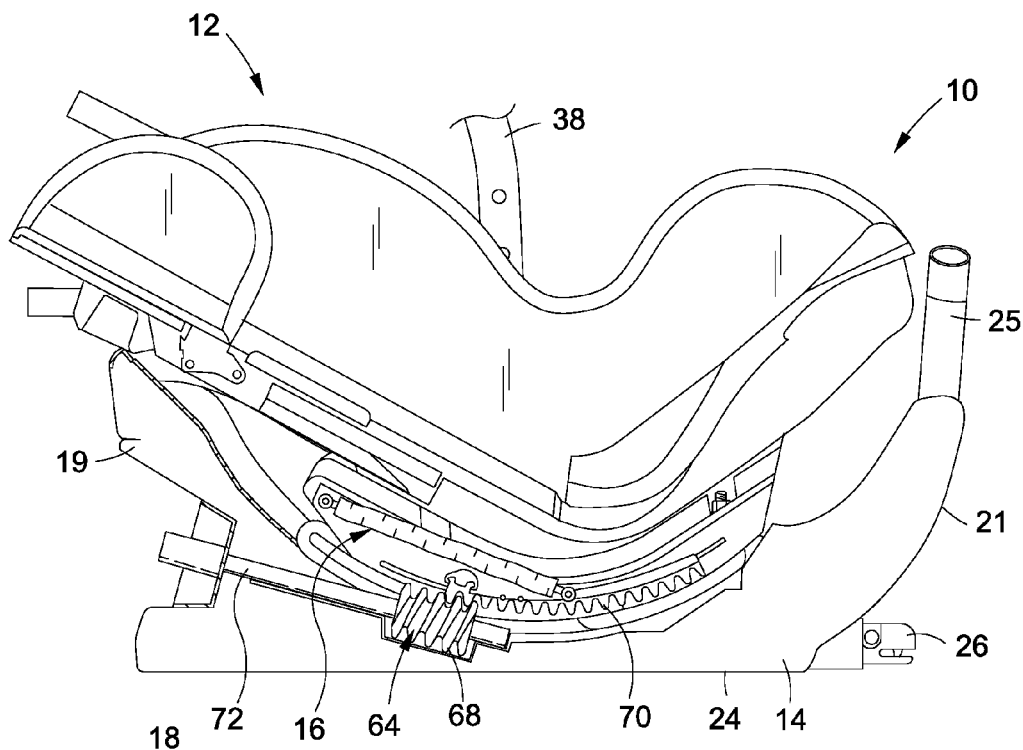
FIG. 9 is a side view of the safety seat depicting the seat unit as coupled to the base unit and in a second exemplary position relative thereto.

Once the seat unit 12 is attached to the base unit 18, the pitch or angle of recline may be adjusted by rotating the shaft 72. When the shaft 72 is rotated in a first direction, the seat unit 12 assumes a more reclined configuration, whereas when the shaft 72 is rotated in a second direction, the seat unit 12 assumes a more upright configuration. FIGS. 8 and 9 show exemplary recline adjustment positions of the seat unit 12 relative to the base unit 18, and in particular the base body 14 thereof. Specifically, by virtue of the rotation of the worm gear 68 via the shaft 72 and associated handle of the seat 10, the seat unit 12 has assumed a more reclined position in FIG. 9 in comparison to its orientation as shown in FIG. 8.

During normal use of the safety seat 10 while the vehicle is moving, the seat unit 12 remains substantially stationary relative to the base unit 18. Such stationary positioning of the seat unit 12 relative to the base unit 18 is facilitated in large measure by the fixed relationship between the flange member 52 and the rack member 70 as achieved by the intervening shear pin 66 and braking element 16. In other words, the shear pin 66 and braking element 16 bridge the base carriage 22 (and hence the seat unit 12) to the base body 14 of the base unit 18 to substantially restrict movement of the seat unit 12 relative to the base body 14.

Figure 11:
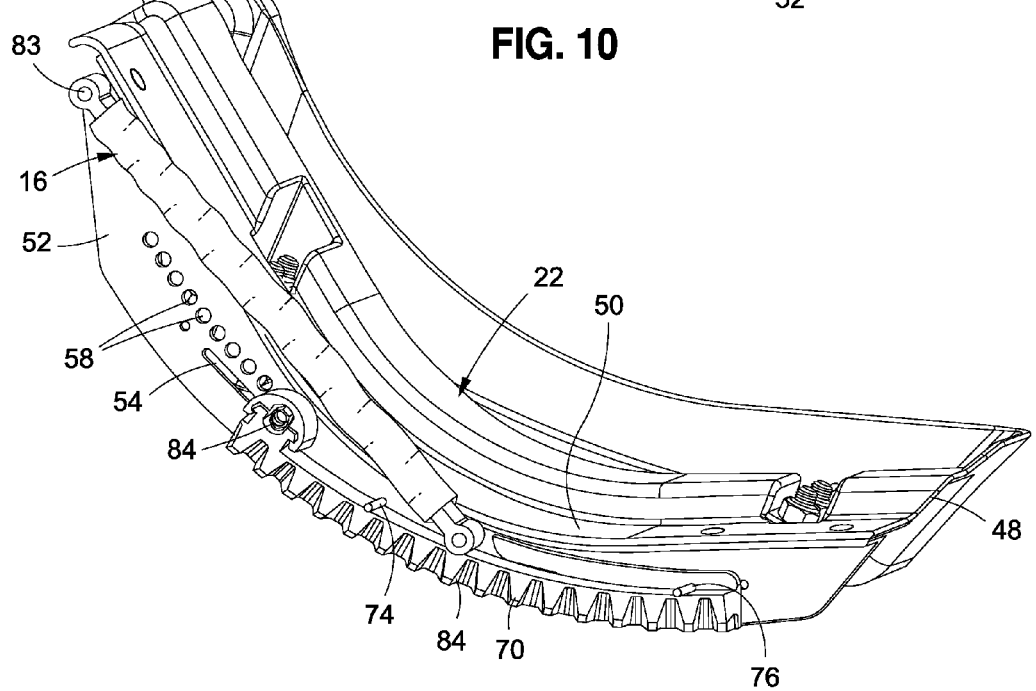
FIG. 11 is a top perspective view depicting the base carriage in a ride down position relative to the braking element and the rack member.

If the vehicle is involved in a sudden event, such as an accident, which causes rapid acceleration or deceleration of the vehicle, large forces act on the safety seat 10. Those forces will urge the seat unit 12 in one direction, while the base unit 18 will remain generally stationary relative to the vehicle by virtue of the attachment of the base unit 18 to the vehicle. The urging of the seat unit 12 relative to the base unit 18 imparts a shearing force on the shear pin 66. If the forces acting on the shear pin 66 are below a prescribed threshold, the shear pin 66 will remain intact, and thus, the seat unit 12 will remain generally stationary relative to the base unit 18. Conversely, if the forces are above the prescribed threshold, the shear pin 66 will be caused to fracture, resulting in the seat unit 12 no longer being restrained relative to the base body 14 by the shear pin 66. Thus, the seat unit 12 transitions from its resting position to the ride down position, such movement being guided by the movement of the guide pins 74, 76 within the corresponding slots 54, 56 formed in the flange member 52. FIGS. 10 and 11 illustrate exemplary movement of the base carriage 22 relative to the rack member 70 as the seat unit 12 transitions from the resting position (see FIG. 10) toward the ride down position (see FIG. 11).

The transition of the seat unit 12 activates the POY used as the braking member 16, which in turn results in such POY imparting a braking force on the seat unit 12 as it moves from the resting position toward the ride down position. According to one embodiment, the POY used as the braking member 16 is specifically adapted to impart a substantially constant braking force on the seat unit 12 as it transitions from the resting position to the ride down position. Once the seat unit 12 reaches the ride down position and movement has ceased, the safety locking mechanism 85 becomes engaged with one of the apertures 58 formed in the flange member 52 to lock the seat unit 12 in place relative to the base body 14. In this respect, engagement of the safety locking mechanism 85 prevents "rocking" of the seat unit 12 relative to the base body 14 after the shear pin 66 has been fractured. With the safety locking mechanism 85 engaged, the seat unit 12 will remain secure relative to the base unit 18 until the driver, rescue personnel, etc. can retrieve the child from the safety seat 10.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A safety seat for securing a child in a vehicle, the safety seat comprising:
    a base unit adapted to be attached to the vehicle, the base unit including:
        a base body;
        a base carriage coupled to the base body and moveable relative thereto from a resting position to a ride down position, the movement of the base carriage from the resting position to the ride down position being caused by a force acting on the base carriage that is above a prescribed threshold;
        an adjustment mechanism coupled to the base body and the base carriage to enable selective, continuous positioning of the base carriage relative to the base body such that the base carriage is fixable relative to the base body in a first recline position, a second recline position, and a plurality of recline positions between the first and second recline positions;
        a primary locking mechanism integrated between the base carriage and the base body;
        a secondary locking mechanism which is independent of the primary locking mechanism and the adjustment mechanism, the secondary locking mechanism being integrated between the base carriage and the base body; and
        a braking element coupled to and extending between the base body and the base carriage, the braking element being adapted to bias the base carriage toward the resting position;
        wherein the primary locking mechanism is structured to normally impede movement of the base carriage toward the ride down position while still allowing movement of the base carriage relative to the base body resulting from use of the adjustment mechanism, but to allow movement of the base carriage toward the ride down position when the force acting on the base carriage exceeds the prescribed threshold, and further wherein the secondary locking mechanism is structured to impede return movement of the base carriage toward the resting position after the ride down position;
    a seat unit detachably engageable with the base carriage and defining a seat cavity to accommodate the child.

2. The safety seat recited in claim 1, wherein the primary locking mechanism comprises a sacrificial pin extending between the base body and the base carriage and adapted to fracture when the force acting on the base carriage is above the prescribed threshold to enable movement of the base carriage relative to the base body.

3. The safety seat recited in claim 1, wherein the adjustment mechanism includes a worm gear rotatably connected to the base body and a complementary rack member attached to the base carriage.

4. The safety seat recited in claim 1, further comprising:
    at least one guide pin coupled to the base body; and
    at least one slot disposed within the base carriage;
    the guide pin extending through and traveling within the slot in a manner guiding the movement of the base carriage from the resting position to the ride down position.

5. The safety seat recited in claim 1, wherein the braking element comprises partially oriented yarn.

6. The safety seat recited in claim 1, wherein the braking element is sacrificial in response to movement of the base carriage from the resting position to the ride down position.

7. The safety seat recited in claim 1, wherein the secondary locking mechanism includes a spring-biased detention member coupled to the base body and a plurality of holes formed in the base carriage and each adapted to accommodate the detention member.

8. A safety seat for securing a child in a vehicle, the safety seat comprising:
    a base unit adapted to be attached to the vehicle, the base unit including:
        a base body; and
        a base carriage coupled to the base body in a manner which restricts relative movement of the base carriage relative to the base body when forces tending to create relative movement between the base carriage and the base body are below a prescribed threshold, and allows movement of the base carriage from a resting position toward a ride down position when forces tending to create relative movement between the base carriage and the base body are above the prescribed threshold;

an adjustment mechanism coupled to the base body and the base carriage to enable selective, continuous positioning of the base carriage relative to the base body;

a primary locking mechanism integrated between the base carriage and the base body;

a secondary locking mechanism which is independent of the primary locking mechanism and the adjustment mechanism, the secondary locking mechanism being integrated between the base carriage and the base body; and a braking element coupled to and extending between the base body and the base carriage, the braking element being adapted to bias the base carriage toward the resting position;

wherein the primary locking mechanism is structured to normally impede movement of the base carriage toward the ride down position while still allowing movement of the base carriage relative to the base body resulting from use of the adjustment mechanism, but to allow movement of the base carriage toward the ride down position when forces tending to create relative movement between the base carriage and the base body exceed the prescribed threshold, and further wherein the secondary locking mechanism is structured to impede return movement of the base carriage toward the resting position only after the primary mechanism allows movement of the base carriage toward the ride down position;

a seat unit detachably engageable with the base carriage and defining a seat cavity to accommodate the child.

9. The safety seat recited in claim 8, wherein the primary locking mechanism comprises a sacrificial pin extending between the base body and the base carriage in a direction generally orthogonal to a direction of movement of the base carriage from the resting position toward the ride down position, the sacrificial pin being fracturable when forces acting on the base carriage are above the prescribed threshold to enable movement of the base carriage relative to the base body.

10. The safety seat recited in claim 8, wherein the adjustment mechanism includes a worm gear rotatably connected to the base body and a complementary rack member attached to the base carriage.

11. The safety seat recited in claim 8, further comprising:
at least one guide pin coupled to the base body; and
at least one slot disposed within the base carriage;
the guide pin extending through and traveling within the slot in a manner guiding the movement of the base carriage from the resting position to the ride down position.

12. The safety seat recited in claim 8, wherein the braking element comprises partially oriented yarn.

13. The safety seat recited in claim 8, wherein the braking element is sacrificial in response to movement of the base carriage from the resting position to the ride down position.

14. The safety seat recited in claim 8, wherein the secondary locking mechanism includes a spring-biased detention member coupled to the base body and a plurality of holes formed in the base carriage and each adapted to accommodate the detention member.

15. The safety seat recited in claim 1, wherein the secondary locking mechanism is structured to impede return movement of the base carriage toward the resting position only after the primary mechanism allows movement of the base carriage toward the ride down position.

* * * * *